US008096024B2

(12) United States Patent
Smith et al.

(10) Patent No.: US 8,096,024 B2
(45) Date of Patent: Jan. 17, 2012

(54) ROPE TERMINATION DEVICE

(75) Inventors: Rory S. Smith, El Cajon, CA (US); Chi Phan, San Diego, CA (US); Alan M. Parker, Alpine, CA (US)

(73) Assignee: Thyssenkrupp Elevator Capital Corporation, Troy, MI (US)

( * ) Notice: Subject to any disclaimer, the term of this patent is extended or adjusted under 35 U.S.C. 154(b) by 696 days.

(21) Appl. No.: 12/190,647

(22) Filed: Aug. 13, 2008

(65) Prior Publication Data

US 2010/0037436 A1 Feb. 18, 2010

(51) Int. Cl.
*F16G 11/04* (2006.01)

(52) U.S. Cl. .................................... 24/136 K; 24/136 L

(58) Field of Classification Search ................. 24/136 L, 24/136 K, 136 R, 115 N, 115 M; 403/314, 403/211, 374.1; 187/411
See application file for complete search history.

(56) References Cited

U.S. PATENT DOCUMENTS 1,266,312 A * 5/1918 Pope ............................ 403/211
1,297,187 A * 3/1919 Lamb ............................ 403/211
2,085,333 A 6/1937 Reynolds
2,217,042 A 10/1940 Bowman
2,482,231 A 9/1949 White
2,710,767 A 6/1955 Howe
3,286,651 A 11/1966 Dahl, Jr.
3,600,765 A 8/1971 Rovinsky et al.
3,654,672 A 4/1972 Bullar
3,982,844 A 9/1976 De Anda et al.
4,117,574 A 10/1978 Yoshida
4,156,574 A 5/1979 Boden
4,243,388 A 1/1981 Arai
4,313,243 A 2/1982 Childress et al.
4,337,553 A 7/1982 Fischer
4,458,389 A 7/1984 Guthmann
4,464,812 A * 8/1984 Crook et al. ................ 24/122.6
4,602,891 A 7/1986 McBride
4,734,961 A 4/1988 Guthmann
4,809,408 A 3/1989 Abrahamson
4,916,850 A 4/1990 Dodge
5,211,500 A 5/1993 Takaki et al.
5,336,846 A 8/1994 Sachs
5,353,893 A 10/1994 Sun et al.
5,526,552 A 6/1996 De Angelis
(Continued)

FOREIGN PATENT DOCUMENTS

GB 139 625 * 3/1920
(Continued)

OTHER PUBLICATIONS

International Preliminary Report on Patentability dated Feb. 15, 2011 for Application No. PCT/US2009/052944.
(Continued)

*Primary Examiner* — James Brittain
(74) *Attorney, Agent, or Firm* — Frost Brown Todd LLC

(57) ABSTRACT

Disclosed is a termination device for an aramid-based elevator rope having a high breaking strength. The termination device comprises a socket having a cylindrical, tapered internal passageway adapted to receive a corresponding wedge. The wedge includes a semi-cylindrical passageway in a substantially helical configuration to increase the surface area between the associated rope and the wedge. The termination device clamps the length of rope between tapered portions of the socket and the semi-cylindrical passageway of the wedge with a substantially uniform application of force on the cross-section of the rope.

4 Claims, 4 Drawing Sheets

U.S. PATENT DOCUMENTS

| | | | |
|---|---|---|---|
| 5,553,360 | A | 9/1996 | Lucas et al. |
| 5,566,786 | A | 10/1996 | De Angelis et al. |
| 5,666,760 | A | 9/1997 | Bramblett et al. |
| 5,988,929 | A | 11/1999 | Doan |
| 6,345,419 | B1 | 2/2002 | Traktovenko |
| 6,353,979 | B1 | 3/2002 | Traktovenko |
| 6,357,085 | B2 | 3/2002 | Ericson et al. |
| 6,513,204 | B2 | 2/2003 | Rivera et al. |
| 6,662,408 | B2 | 12/2003 | Perez et al. |
| 6,662,739 | B1 | 12/2003 | Radford |
| 6,695,098 | B1 | 2/2004 | Henley et al. |
| 6,854,164 | B2 | 2/2005 | Bass et al. |
| 6,994,487 | B2 | 2/2006 | Traktovenko |
| 7,228,599 | B2 | 6/2007 | Dupont |

FOREIGN PATENT DOCUMENTS

| | | | |
|---|---|---|---|
| GB | 286 428 | * | 3/1928 |
| GB | 482 984 | * | 4/1938 |
| GB | 540 188 | * | 10/1941 |
| GB | 553 203 | * | 5/1943 |
| GB | 682 849 | * | 11/1952 |
| GB | 1 056 990 | * | 2/1967 |
| GB | 1 139 841 | * | 1/1969 |
| GB | 1 341 013 | * | 12/1973 |
| GB | 1 355 004 | * | 6/1974 |
| GB | 1 369 842 | * | 10/1974 |
| GB | 1 380 800 | * | 1/1975 |
| GB | 1 591 845 | * | 6/1981 |
| WO | WO 2007/086763 | * | 8/2007 |

OTHER PUBLICATIONS

International Search Report dated Oct. 23, 2009 for Application No. PCT/US2009/052944.

* cited by examiner

ROPE TERMINATION DEVICE

BACKGROUND OF THE INVENTION

An elevator is a hoisting and lowering mechanism equipped with a car or platform which moves in guides in a vertical direction. Traction elevator systems typically include a cab, a counterweight, one or more ropes interconnecting the cab and counterweight, a traction sheave to move the rope(s), and a motor to rotate the traction sheave. Elevator ropes conventionally comprise laid or twisted steel wire and the sheave is formed of cast iron.

Electric elevators are suspended and moved by a series of pulleys (sheaves) and cables (ropes). In a typical arrangement, a wire rope is reeved over a number of sheaves, terminating in a hitch on the top and bottom of the car. Care is typically taken during the installation to mount the various sheaves in the machine room or on the car in such a manner as to ensure only vertical strain is applied to the wire ropes terminating in hitches. This reduces metal fatigue on the wire rope that would occur if subjected to horizontal bending forces.

Tensile strength measures the stress required to pull something such as rope, wire, or a structural beam to the point where it breaks. It is an intensive property of the material. The tensile strength of a material is the maximum amount of tensile stress that it can be subjected to before failure. There are three typical definitions of tensile strength: (1) yield strength, which is the stress at which material strain changes from elastic deformation to plastic deformation, causing it to deform permanently; (2) ultimate strength, which is the maximum stress a material can withstand; and (3) breaking strength, which is the stress coordinate on the stress-strain curve at the point of rupture. The tensile strength of an elevator rope system is often at its weakest point at the termination of the elevator rope. The uniform forces on the rope along the wedge effectively lock the rope in the termination. As the rope tension increases, the differential compressive forces at the nose of the termination will also increase accordingly.

For example, a rope having a rated breaking strength of 25,000 lbs may be limited by the termination device, which may reduce the overall breaking strength of the system to a fraction of the percentage, such as 65% of the rope itself. According to the European code (EN81), the minimum required breaking strength of the termination is 85% of the full breaking strength of the rope. If the rope termination is only 65% of the breaking strength of the rope, the rope will have to be rated at a lower number to meet this requirement.

Coated steel belts (CSB's) have been developed which are strong enough to replace the traditional wire cables used with elevators. These CSB's permit sheave and hitch arrangements that were not practical when using wire ropes. In an arrangement where the CSB hitch or termination is subjected to horizontal forces as well as vertical forces, metal fatigue is a concern. Conventional steel ropes and the cast iron sheaves that move them have certain limitations in their use. One such limitation is the traction forces between the ropes and the sheave. Drive sheaves with large diameters are often needed to obtain the required traction to move the components in the system without the rope slipping over the sheave. Another limitation on the use of steel ropes is the flexibility and fatigue characteristics of steel wire ropes. Aramid-based ropes are being developed to overcome the problems associated with steel cables. Conventional termination devices, however, do not readily lend themselves to use with aramid-based ropes, where aramid-based ropes tend to slip out of such devices and, consequently, a dangerous condition may result. Furthermore, termination devices may reduce the overall breaking strength of the elevator rope system such that more rope will be needed to meet the minimum safety factor.

Accordingly, there is a need for a termination device that can accommodate aramid-based elevator ropes. It would be further advantageous to provide a termination device to accommodate aramid-based elevator ropes that minimally reduces the breaking strength of the overall system. It would be further advantageous to provide a termination device that reduces the breaking strength of a rope by 85% or less to avoid such that the rope will no longer need to be rated at a lower breaking strength and less rope can be used for a specific application.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings.

Reference will now be made in detail to the present preferred embodiment of the invention, an example of which is illustrated in the accompanying drawings.

DETAILED DESCRIPTION

Disclosed is a termination device for an aramid-based elevator rope having a high breaking strength. In one version, the termination device comprises a socket having a cylindrical, tapered internal passageway adapted to receive a corresponding wedge. The wedge includes a semi-cylindrical passageway in a substantially helical configuration to increase the surface area between the associated rope and the wedge. The termination device clamps the length of rope between tapered portions of the socket and the semi-cylindrical passageway of the wedge with a substantially uniform application of force on the cross-section of the rope. The termination uniformly distributes the compression force along the entire length of the termination. This uniform compression force is set such that it will neither crush the rope nor allow the rope will slip out of the termination.

Figure 1:
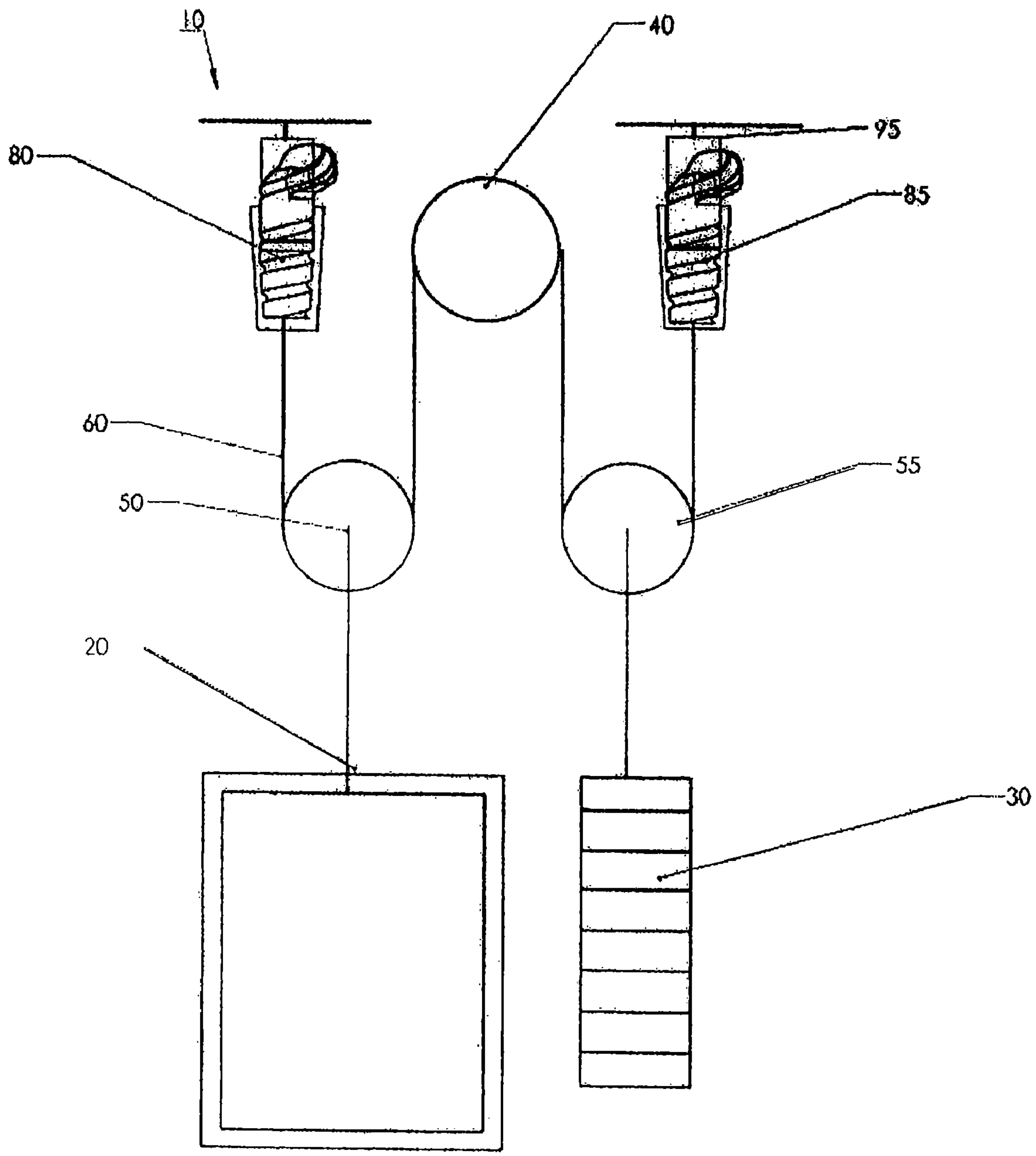
FIG. 1 is an illustration of a typical traction elevator system showing the interconnection of various components of the system, including one version of a termination device.

Referring now to the drawings in detail, wherein like numerals indicate the same elements throughout the views, FIG. 1 is an illustration of one version of a traction elevator system 10. The system includes a car 20, a counterweight 30, and a traction drive sheave 40. The car and the counterweight are connected to one another by a tension member or rope 60 that rides over the drive sheave 40, and sheaves 50 and 55, located over the car 20 and the counterweight 30, respectively. The tension member or rope 60 is attached to the top of the hoistway at its ends by rope termination devices 80 and 85. It will be appreciated that the traction elevator system 10 is described by way of example only, where the rope termination devices may be used with any suitable elevator system or any other system where ropes, cables, wire ropes, or the like, are mounted.

The tension member or rope 60 shown in FIG. 1 preferably comprises an aramid-based rope. Aramid is herein defined as any of a class of synthetic aromatic long-chain polyamides capable of extrusion into fibers having resistance to high temperatures and great strength. Suitable materials include Kevlar® aramid fiber, which is a poly-para-phenylene terephthalamide aramid. Termination devices 80 and 85 are used to terminate the aramid-based rope in a manner that is secure and safe. It will be appreciated that the termination devices described herein are not limited to use with aramid fibers and may be used with any suitable rope, cable, wire rope, or the like.

Figure 3:
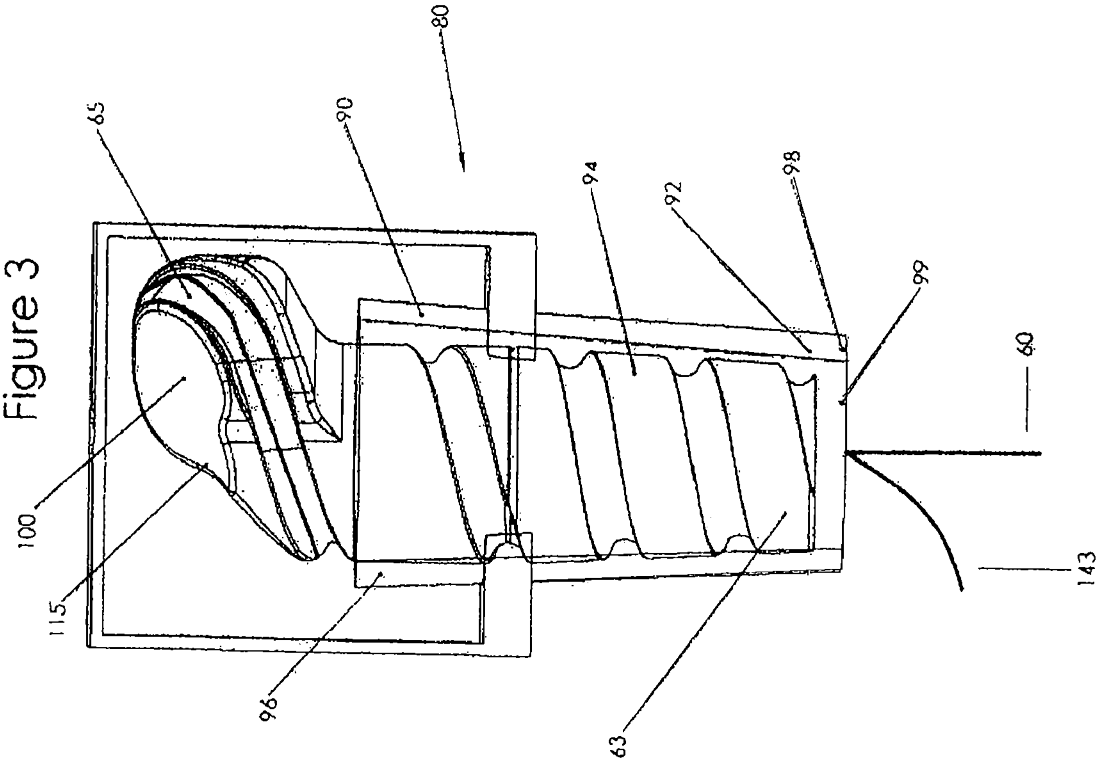
FIG. 3 is a plan view of the device shown in FIG. 2.
Figure 2:
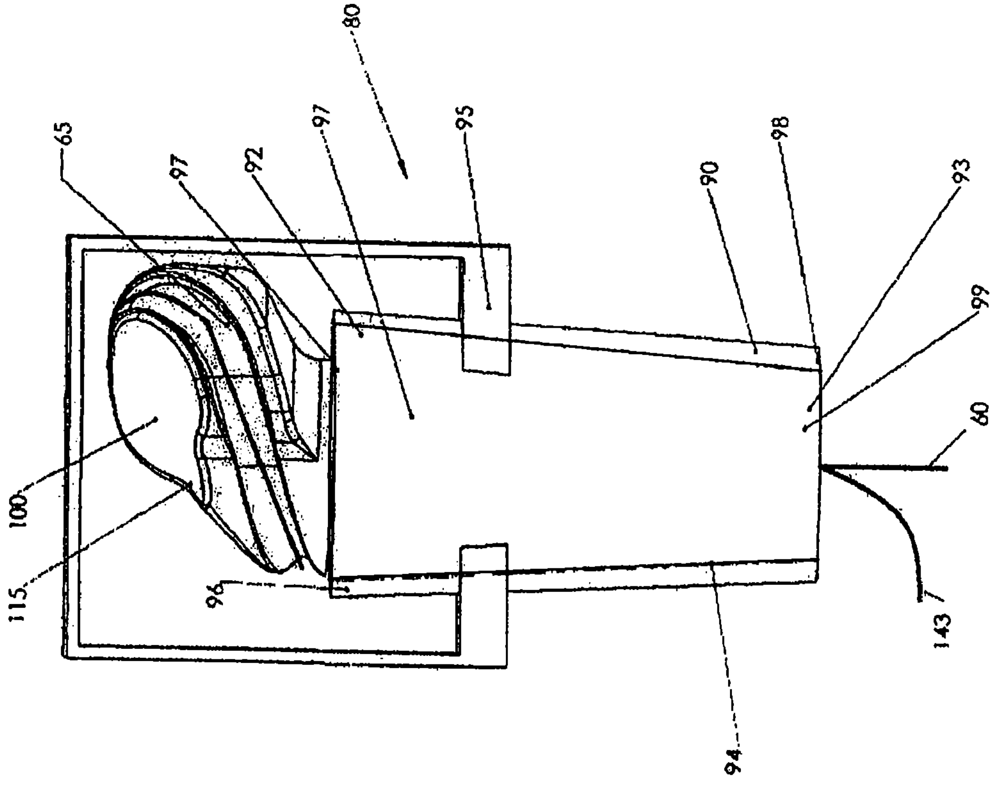
FIG. 2 is a perspective drawing of one version of a rope termination device showing the socket and wedge and a rope inserted therein.

FIGS. 2 and 3 illustrate one version of a rope termination device 80. The termination device 80 comprises a socket 90 configured to engage a wedge 100 such that the terminal end of a rope 60 is fixedly secured. The socket 90 or housing of the termination device 80 is configured for attachment via a fastener 95 to a hoistway, an elevator car, or any other suitable location where termination of a rope or cable is desired. In FIG. 1, the termination devices 80,85 are fixed to the roof of a hoistway with fasteners 95. The socket 90 and/or fastener 95 may be welded, hinged, or otherwise affixed in any suitable manner to such a location.

Referring to FIGS. 2 and 3, the body 92 of the socket 90 has a large end 96 and a small end 98 defining an internal passageway extending from a rear opening 97 to a front opening 93. The rear opening 97 is configured to accept the wedge 100 when the termination device 80 is assembled. The inner surface 94 of the socket 90 defines a tapered passageway 99 that corresponds to the taper of the wedge 100 such that, for example, an aramid elevator rope is fixedly secured when the wedge 100 is inserted into the socket 90 and the termination device 80 is assembled. When inserted, the wedge 100 engages the socket 90 in a luer slip fashion. The inner surface 94 of the socket 90 may be smooth, polished, and uniform, or it may include surface effects designed to engage and retain the wedge 100 and/or the rope 60. The dimensions and specific type of the socket, including groove depth and size, can be adjusted depending on the rope diameter.

Still referring to FIGS. 2 and 3, the wedge 100 is shown disposed within the tapered passageway 99 of the socket 90 to retain and secure the rope 60. The wedge 100, which corresponds in shape to the passageway of the socket 90, has a large end 65, a small end 63, and a tapered portion 67 between the large and small ends 65, 63. When the rope termination device is assembled, the large end 65 and the small end 63 of the wedge 100 are adjacent the large end 96 and small end 98 of the socket, respectively.

Figure 4:
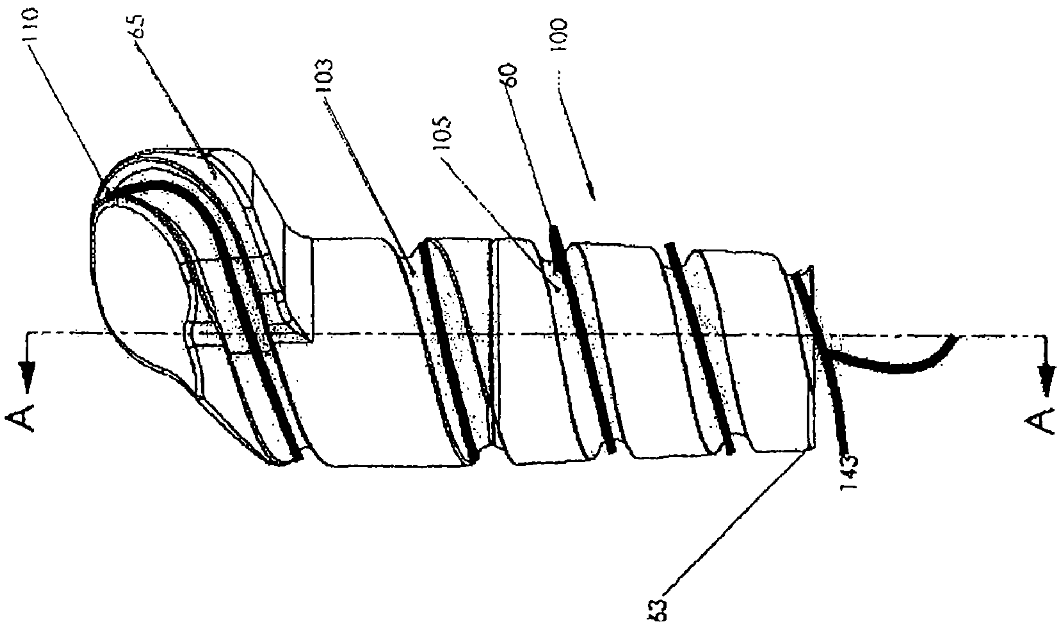
FIG. 4 is a plan view of one version of a wedge.
Figure 6:
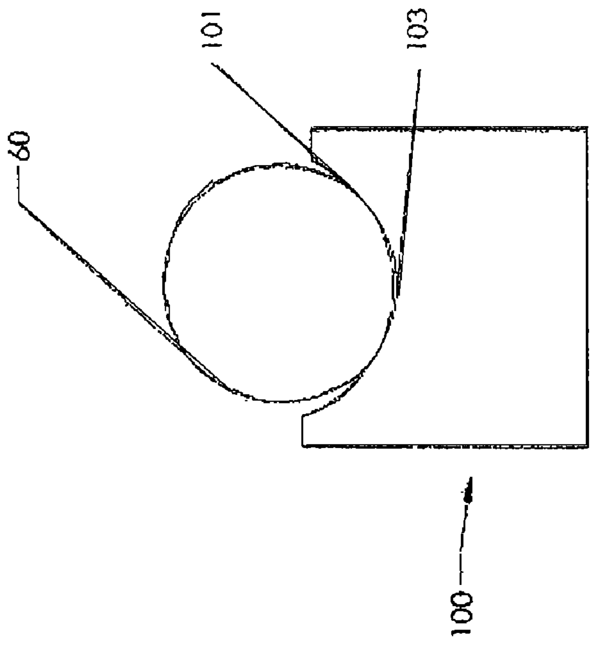
FIG. 6 is a cross-section of the peripheral groove of the wedge taken along lines 6-6 of FIG. 5 with a rope riding therein.
Figure 5:
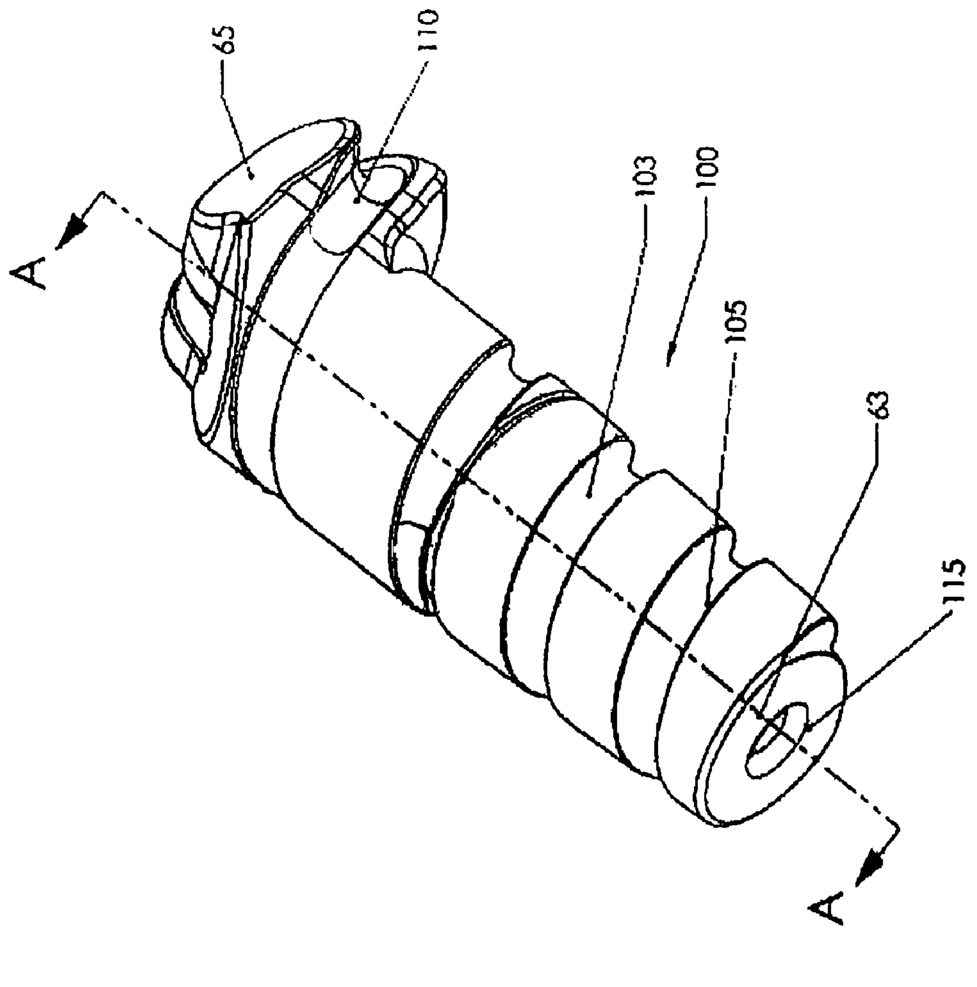
FIG. 5 is a perspective view of the wedge of FIG. 4 showing various portions of a semi-cylindrical passageway.

Referring to FIGS. 4-5, the wedge 100 has a uniform diameter, throughall bore 115 along a central axis A-A. In one version the throughall bore 115 is slightly larger than the diameter of the rope 60. The bore 115 is configured to accept a portion of the rope 60 under tension through the opening of the bore at the small end 63 of the wedge 100. The rope 60 passes through the bore 115 and out the opening in the large end 65 of the wedge 100. The wedge 100 further comprises a peripheral groove 103 in the outer surface of the wedge 100 that is configured to receive the rope 60 after it passes through the bore 115. In one version, the rope is manually wrapped around the wedge. The length of the wrap will affect the compressive force on the rope, since the compressive force is uniformly distributed along the wedge. As the wedge is shortened, the rope will experience a higher compressive force.

As illustrated in FIGS. 4 and 5, the wedge 100 contains a peripheral groove 103 for receiving a rope 60. The peripheral groove 103 on the wedge 100 may have a continuous or variable radius of curvature. The groove 103 preferably approximates the shape of the rope such that the rope is securely bound between the wedge 100 and the socket 90 when the termination device is assembled. The depth of the groove may vary depending on the rope diameter, where the depth of the groove may be selected to provide sufficient friction between the rope and wedge without crushing the rope.

The peripheral groove 103 is divided into an upper portion 110 and a lower portion 105 having a substantially helical shape. The helical configuration is described by way of example only, where any suitable configuration that extends the contact surface area between the rope and termination is contemplated.

The upper portion 110 is configured to accept the rope 60 as it passes from the central bore. After exiting the bore 115 the rope 60 is wound around both the upper portion 110 and lower portion 105 of the wedge 100. The large radius of the top portion is to allow the rope to wrap around wedge without carrying majority of the load.

After the rope 60 has been fitted into the peripheral groove 103 the wedge 100 is urged into the socket 90 such that the wedge 100 and socket engage in a luer slip relationship. In one version, the rope is fully wrapped around the wedge prior to the assembly.

In the assembled configuration, the rope 60 passes through the front opening 93 of the socket, through the bore 115 of the wedge, and around the peripheral groove 103 of the wedge 100. The live end of the rope, which passes through the bore 115, is connected to another component in the elevator system, such as a sheave, whereas the dead end of the rope 143 does not bear a load. The wedge 100 may be formed from any material which will retain its structural integrity and can keep the rope 60 secured in the termination device 80 without slippage. In one version the wedge 100 is constructed of polished steel. It will be appreciated that any suitable material, such as cast iron, may be used.

In summary, numerous benefits have been described which result from employing the concepts of the invention. The foregoing description of one or more embodiments of the invention has been presented for purposes of illustration and description. It is not intended to be exhaustive or to limit the invention to the precise form disclosed. Obvious modifications or variations are possible in light of the above teachings. The one or more embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A rope termination assembly comprising:

(a) a rope;

(b) a termination body, the termination body having;

(i) a first portion, the first portion having a truncated conical configuration, (ii) a second portion, the second portion being integral with the first portion, wherein the second portion has a bulbous shape, (iii) a bore, the bore passing from a first aperture in the first portion through a second aperture in the second portion of the termination body, (iv) a groove, the groove being formed within the outer surface of the termination body, wherein the groove extends from the second aperture along the second portion and the first portion of the termination body, wherein the groove is a helical groove, (v) wherein the rope is configured to pass through the first aperture, through the second aperture, and is seated within the groove in the termination body; and (c) a socket, wherein the socket is configured to accept the termination body such that the rope is compressed between the socket and the termination body.

2. The rope termination assembly of claim 1, wherein the helical groove is configured such that the rope is subject to a substantially uniform compression along the length of the helical groove when the termination body is engaged with the socket.

3. The rope termination assembly of claim 1, wherein the bore is aligned with a central axis of the termination body.

4. The rope termination assembly of claim 1, wherein the rope is aramid fiber rope.

* * * * *